UNITED STATES PATENT OFFICE.

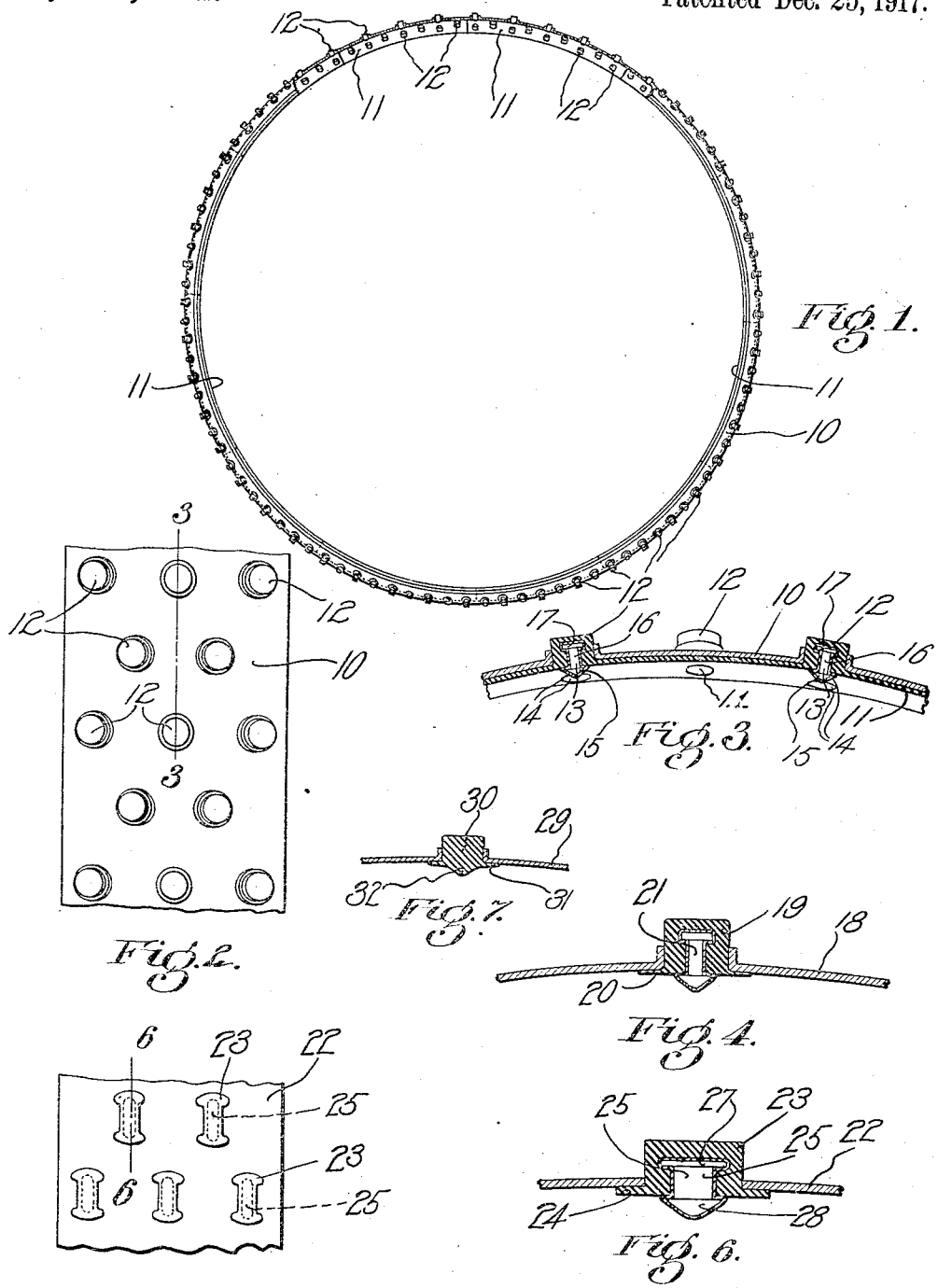

ROBERT C. GREENERD, OF WINTHROP, MASSACHUSETTS, ASSIGNOR OF ONE-HALF TO JOHN W. SCHAEFFER, OF BOSTON, MASSACHUSETTS.

TIRE-PROTECTOR.

1,251,014.     Specification of Letters Patent.     Patented Dec. 25, 1917.

Application filed July 9, 1917. Serial No. 179,340.

*To all whom it may concern:*

Be it known that I, ROBERT C. GREENERD, a citizen of the United States, residing at Winthrop, in the county of Suffolk and State of Massachusetts, have invented new and useful Improvements in Tire-Protectors, of which the following is a specification.

This invention relates to an improved protector for the tires of automobiles and the like. The device also serves the purpose of preventing skidding.

The object of the invention is to provide a protector for tires which may be readily applied and which will protect the tire from puncture and wear and which will also serve to prevent the automobile from skidding. The device is capable of being easily applied to the tire and when once applied is held firmly in place by its construction and, furthermore, said device may be easily repaired and the parts thereof are capable of being easily renewed.

The invention consists in a tire protector such as hereinafter described in the specification and constructed particularly as set forth in the claims.

Referring to the drawings:

Figure 1 is a side elevation, partly in section, of my improved tire protector.

Fig. 2 is a top plan view of a portion of the same.

Fig. 3 is an enlarged detail section taken on line 3—3 of Fig. 2.

Fig. 4 is a section similar to Fig. 3 illustrating a modified form of my invention.

Fig. 5 is a view similar to Fig. 2 illustrating a modified form of my invention.

Fig. 6 is a detail section enlarged taken on line 6—6 of Fig. 5.

Fig. 7 is a detail section similar to Fig. 4 illustrating a modified form of my invention.

Like numerals refer to like parts throughout the several views of the drawings.

In the drawings, referring to Figs. 1, 2 and 3, 10 is an annular strip of sheet material, preferably of metal, which is adapted to extend entirely around the tire of an automobile in a continuous piece. 11, 11 are sheets of flexible material, such as rubber, with their edges abutting, as seen in Fig. 1, and extending along the inner face of the annular strip 10. Said sheets of flexible material are provided with a plurality of plugs 12, of resilient material, preferably rubber, which extend outwardly from the sheet 11 and through the annular strip 10. Each of the plugs 12 has molded therein a stud 13 and said studs are provided with a covering 14, preferably of rubber.

The studs 13 are each provided with a head 15 which projects beyond the inner face of the sheet 11 and said rubber covering 14 extends over the head 15. A shank 16 connects the head 15 of the stud 13 with a flange 17 which is embedded in the plug 12 and serves as an anchor to hold said stud 13 within said plug. The heads 15 are somewhat rounded and preferably somewhat conical in shape in order to engage and preferably sink into the shoe of the tire when the latter is inflated.

The protector hereinbefore specifically described is used in the following manner: When the tire is deflated the protector is placed over the same and the tire is then inflated, the heads 15 of the studs 13 sinking into the shoe of the tire and thus holding the protector firmly in position against lateral or circumferential movement with relation to said tire.

In Fig. 4 a modification of my invention is illustrated in which an annular strip 18, similar to the strip 10 hereinbefore referred to, is provided with a plurality of individual plugs 19 formed of resilient material, each of said plugs having thereon a flange 20 which rests against the inner face of the annular strip 18. Said plugs are each provided with a stud 21 molded therein and substantially like the stud 13 hereinbefore described.

Referring to Figs. 5 and 6, which illustrate a modified form of my invention, 22 is an annular strip of sheet material, preferably metal. 23 is an individual plug of resilient material having a flange 24 thereon which bears against the inner face of the annular strip 22. In said plug 23 is molded a stud 25 similar to the stud 13 except that it is oblong instead of cylindrical in cross section, but has, like said stud 13, an anchoring flange 27 and a head 28.

The forms of my invention illustrated in Fig. 4 and in Figs. 5 and 6 are applied to the tire in exactly the same manner as the form illustrated in Figs. 1, 2 and 3, hereinbefore described.

It is evident that, if desired, in repairing the device a section of the sheet material 11 with said plugs 12 may be removed from the strip 10 and a new section of sheet material with plugs thereon inserted in its place, or, if the embodiment of my invention illustrated in Fig. 4 is employed, then one or more of said plugs may be replaced as they become worn out.

In Fig. 7 a modified form of my invention is illustrated in which 29 is an annular strip of sheet material, 30 is a plug of resilient material having a flange 31 thereon which contacts with the inner face of the annular strip 29, said plug 30 having a projection 32 upon its inner face, which, when the device is attached to a tire, is adapted to project into said tire and anchor the protector against slipping upon said tire.

Having thus described my invention, what I claim and desire by Letters Patent to secure is:

1. A tire protector having, in combination, a piece of sheet material, a plug of resilient material projecting through said sheet material, a flange on said plug bearing against the inner face of said sheet material and a projection on the inner face of said plug adapted together with said flange to engage the periphery of the tire to which said protector is attached.

2. A tire protector having, in combination, a piece of sheet material, a plug of resilient material projecting through said sheet material, a flange on said plug bearing against the inner face of said sheet material and a stud embedded in said plug and projecting beyond the inner face thereof to engage the periphery of a tire to which said protector is attached.

3. A tire protector having, in combination, a piece of sheet material, a plug of resilient material projecting through said sheet material, a flange on said plug bearing against the inner face of said sheet material, a stud embedded in said plug and a head on said stud projecting beyond the inner face of said plug and adapted to engage the periphery of a tire to which said protector is attached.

4. A tire protector having, in combination, a piece of sheet material, a plug of resilient material projecting through said sheet material, a flange on said plug bearing against the inner face of said sheet material, a metal stud embedded in said plug, a head on said stud projecting beyond the inner face of said plug and a covering for said head, said head being adapted to engage the periphery of a tire to which said protector is attached.

5. A tire protector having, in combination, a piece of sheet material, an oblong plug of resilient material projecting through said sheet material, a flange on said plug bearing against the inner face of said sheet material and a stud embedded in said plug and projecting beyond the inner face thereof to engage the periphery of a tire to which said protector is attached.

In testimony whereof I have hereunto set my hand in presence of two subscribing witnesses.

ROBERT C. GREENERD.

Witnesses:
SYDNEY E. TAFT,
HATTIE E. STRATTON.

Copies of this patent may be obtained for five cents each, by addressing the "Commissioner of Patents, Washington, D. C."